United States Patent
Asghari et al.

(10) Patent No.: US 12,306,350 B2
(45) Date of Patent: May 20, 2025

(54) INCREASING RATE OF LIDAR MEASUREMENTS

(71) Applicant: SiLC Technologies, Inc., Monrovia, CA (US)

(72) Inventors: Mehdi Asghari, La Canada Flintridge, CA (US); Nirmal Chindhu Warke, Saratoga, CA (US); Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 860 days.

(21) Appl. No.: 17/494,822

(22) Filed: Oct. 5, 2021

(65) Prior Publication Data

US 2023/0104453 A1    Apr. 6, 2023

(51) Int. Cl.
*G01C 3/08*    (2006.01)
*G01S 7/4912*    (2020.01)
*G01S 17/06*    (2006.01)
*G01S 17/58*    (2006.01)

(52) U.S. Cl.
CPC .......... *G01S 7/4912* (2013.01); *G01S 17/06* (2013.01); *G01S 17/58* (2013.01)

(58) Field of Classification Search
CPC ........ G01S 7/4912; G01S 17/06; G01S 17/58
See application file for complete search history.

(56) References Cited

U.S. PATENT DOCUMENTS

| 2015/0177367 A1 | 6/2015 | Sebastian et al. |
| 2017/0328988 A1 | 11/2017 | Magee et al. |
| 2019/0033453 A1 | 1/2019 | Crouch et al. |

(Continued)

FOREIGN PATENT DOCUMENTS

JP    2017211348 A  * 11/2017  ............ G01S 13/86

OTHER PUBLICATIONS

Lindner, Nora, International Preliminary Report on Patentability and Written Opinion, PCT/US2022/044631, The International Bureau of WIPO, Apr. 18, 2024.

(Continued)

*Primary Examiner* — Mark Hellner
(74) *Attorney, Agent, or Firm* — Gavrilovich, Dobb & Lindsey LLP (57) ABSTRACT

A LIDAR system outputs a system output signal such that the system output signal can be reflected by an object located outside of the LIDAR system. The system also receives a system return signal that includes light from the reflected LIDAR output signal. The system return signal and the system output signal each carries a first channel. The LIDAR system combine light that is from the system return signal and that carries the first channel with a reference signal so as to produce a composite signal beating at a beat frequency. Electronics operate the LIDAR system such that the first channel has a series of chirp cycles. Each chirp cycle includes a linear chirp section where a frequency chirp of the channel is linear. Multiple different sample periods fall within each of the linear chirp sections. The electronics calculate LIDAR data for each of the sample periods from the beat frequency of the composite signal during the sample period. The LIDAR data for a sample period indicates the radial velocity and/or distance between the LIDAR system and the object.

21 Claims, 7 Drawing Sheets

(56) References Cited

U.S. PATENT DOCUMENTS

| | | | |
|---|---|---|---|
| 2019/0064358 A1* | 2/2019 | Desai | G01S 7/4911 |
| 2019/0369244 A1 | 12/2019 | Asghari et al. | |
| 2020/0309949 A1 | 10/2020 | Feng et al. | |
| 2020/0333443 A1 | 10/2020 | Boloorian et al. | |
| 2021/0109195 A1 | 4/2021 | Feng et al. | |
| 2021/0181320 A1 | 6/2021 | Oza et al. | |
| 2021/0333386 A1* | 10/2021 | Park | G01S 7/356 |
| 2023/0104453 A1 | 4/2023 | Asghari et al. | |

OTHER PUBLICATIONS

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Matos, Taina, International Search Report and Written Opinion, PCT/US2022/044631, The International Searching Authority, United States Patent and Trademark Office, Jul. 6, 2023.

* cited by examiner

Figure 7

INCREASING RATE OF LIDAR MEASUREMENTS

FIELD

The invention relates to optical devices. In particular, the invention relates to LIDAR systems.

BACKGROUND

The performance demands placed on LIDAR systems is increasing as these systems support an increasing number of applications. LIDAR systems generally generate LIDAR data for a series of sample regions that are each sequentially illuminated by a system output signal. The LIDAR data for a sample region indicates the radial velocity and/or distance between the LIDAR system and one or more objects located in the sample region. The LIDAR system can scan the system output signal to multiple different sample regions. The sample regions can be stitched together to form a field of view for the LIDAR system. As a result, the LIDAR data from the different sample regions provides the LIDAR data for objects within the field of view.

Increasing the rate at which the LIDAR data can be generated for the different sample regions can increase the frequency that the field of view can be scanned and/or can increase the resolution for the field of view. As a result, increasing the LIDAR data generation rate can increase the number of applications to which a LIDAR system can be successfully applied. However, increasing the LIDAR data generation rate often increases the complexity and/or costs of the LIDAR system. As a result, there is a need for improved LIDAR systems.

SUMMARY

A LIDAR system outputs a system output signal such that the system output signal can be reflected by an object located outside of the LIDAR system. The system also receives a system return signal that includes light from the reflected LIDAR output signal. The system return signal and the system output signal each carries a first channel. The LIDAR system combines light that is from the system return signal and that carries the first channel with a reference signal so as to produce a composite signal beating at a beat frequency. Electronics operate the LIDAR system such that the first channel has a series of chirp cycles. Each chirp cycle includes a linear chirp section where a frequency chirp of the channel is linear. Multiple different sample periods fall within each of the linear chirp sections. The electronics calculate LIDAR data for each of the sample periods from the beat frequency of the composite signal during the sample period. The LIDAR data for a sample period indicates the radial velocity and/or distance between the LIDAR system and the object.

A method of operating a LIDAR system includes causing a system output signal to be output from the LIDAR system such that the system output signal can be reflected by an object located outside of the LIDAR system. The method also includes receiving a system return signal at the LIDAR system. The system return signal includes light from the reflected LIDAR output signal. The system return signal and the system output signal each carries a first channel that has a series of chirp cycles. Each chirp cycle includes a linear chirp section where a frequency chirp of the channel is linear. The method also includes combining light that is from the system return signal and that carries the first channel with a reference signal so as to produce a composite signal beating at a beat frequency. The method further includes calculating LIDAR data for sample periods that are arranged such that multiple different sample periods fall within each of the linear chirp sections. The LIDAR data for a sample period is calculated from the beat frequency of the composite signal during the sample period. The LIDAR data for a sample period indicates the radial velocity and/or distance between the LIDAR system and the object.

BRIEF DESCRIPTION OF THE FIGURES

FIG. 6A through FIG. 6B illustrate an example of suitable processing components for use with a LIDAR system constructed according to FIG. 4.

DESCRIPTION

A LIDAR system outputs a system output signal such that the system output signal can be reflected by an object located outside of the LIDAR system. The system also receives a system return signal that includes light from the reflected LIDAR output signal. The system return signal and the system output signal each carries a first channel. The LIDAR system combine light that is from the system return signal and that carries the first channel with a reference signal so as to produce a composite signal beating at a beat frequency.

Electronics operate the LIDAR system such that the first channel has a series of chirp cycles. Each chirp cycle includes a linear chirp section where a frequency chirp of the channel is linear. Multiple different sample periods fall within each of the linear chirp sections. The electronics calculate LIDAR data for each of the sample periods from the beat frequency of the composite signal during the sample period.

Since multiple different sample periods fall within each of the linear chirp sections, multiple LIDAR data results can be generated from a single chirp of the first channel. In contrast, prior systems required at least one chirp per channel per LIDAR data result. The ability to generate multiple LIDAR data results using a single chirp of the first channel allows the rate of LIDAR data generation to be increased. For instance, the sample periods can be overlapped in time allowing the rate that LIDAR data is generated to be multiples of the rate that can be achieved with serially positioned sample periods.

Further, linear chirp sections for a single channel are often separated by non-linear chirp sections that result from technological limitations in switching between different chirp patterns. These non-linear chirp sections reduce the amount of time available for the generation of reliable LIDAR data. The ability to generate multiple LIDAR data results using one chirp of a channel allows the duration of the linear chirp sections to have a longer duration than is used in prior systems. The increased duration of the linear chirp sections reduces the portion of time occupied by the non-linear chirp sections and makes more time available for generation of LIDAR data.

Figure 1:
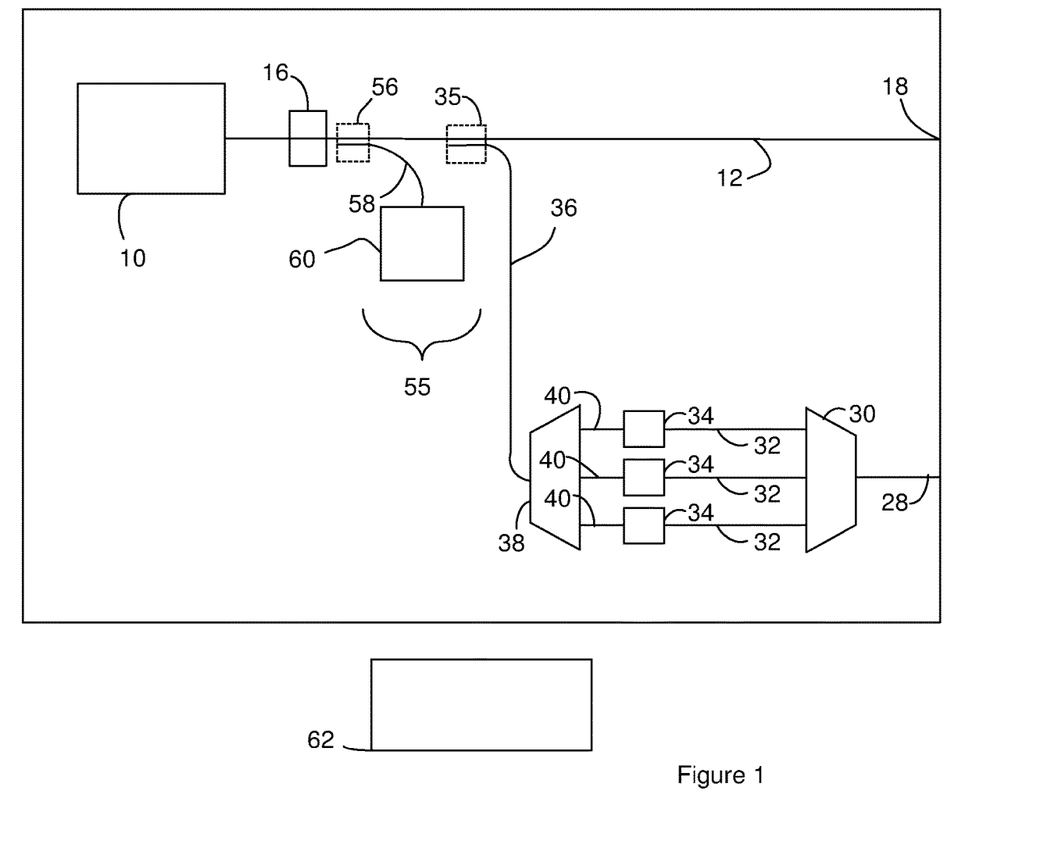
FIG. 1 is a schematic of a LIDAR chip.

FIG. 1 is a schematic of a LIDAR chip. The system includes a light source 10 such as a laser that outputs an outgoing LIDAR signal. The outgoing LIDAR signal includes multiple different channels that are each at a different wavelength. The wavelengths of the channels can be periodically spaced in that the wavelength increase from one channel to the next channel is constant or substantially constant. A suitable light source 10 for generating multiple channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, grated U.S. Pat. No. 7,542,641, entitled "Multi-Channel Optical Device," and incorporated herein in its entirety.

The LIDAR system also includes a utility waveguide 12 that receives an outgoing LIDAR signal from the light source 10. An amplifier 16 is optionally positioned along the utility waveguide 12. Since the power of the outgoing LIDAR signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing LIDAR signal to an exit port 18 through which the outgoing LIDAR signal can exit from the LIDAR chip and serve as a LIDAR output signal that carries the different channels. Examples of suitable exit ports include, but are not limited to, waveguide facets such as the facets of the utility waveguides 12. Light from the LIDAR output signal travels away from the LIDAR system in a system output signal. In some instances, the portion of the LIDAR output signal that exits from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The system output signal can travel through free space in the atmosphere in which the LIDAR system is positioned. The system output signal may be reflected by one or more objects in the path of the system output signal. When the system output signal is reflected, at least a portion of the reflected light travels back toward the LIDAR chip as a system return signal.

Light from the system return signal can be carried in a first LIDAR input signal that is received by the LIDAR chip. In some instances, a portion of the system return signal can serve as a LIDAR input signal that can carry the different channels. The LIDAR chip includes a comparative signal waveguide 28 that receives the LIDAR input signal. Light from the LIDAR input signal that is received by the comparative signal waveguide 28 can serve as a comparative incoming LIDAR signal.

The comparative signal waveguide 28 carries the comparative incoming LIDAR signal to a comparative demultiplexer 30. When the comparative light signal includes multiple channels, the comparative demultiplexer 30 divides the comparative incoming LIDAR signal into different comparative signals that each carries a different one of the channels. The comparative demultiplexer 30 outputs the comparative signals on different comparative waveguides 32. The comparative waveguides 32 each carry one of the comparative signals to different processing components 34. Accordingly, the different processing components 34 each receives a comparative signal carrying a different one of the channels.

The LIDAR chip includes a splitter 35 configured to move a portion of the outgoing LIDAR signal from utility waveguide 12 onto a reference signal waveguide 36. The portion of the outgoing LIDAR signal received by the reference signal waveguide 36 serves as a reference light signal. The reference signal waveguide 36 carries the reference light signal to a reference demultiplexer 38. When the reference light signal includes multiple channels, the reference demultiplexer 38 divides the reference light signal into different reference signals that each carries a different one of the channels. The reference demultiplexer 38 outputs the reference signals on different reference waveguides 40. The reference waveguides 40 each carry one of the reference signals to a different one of the processing components 34. Accordingly, the different processing components 34 each receives a reference signal carrying a different one of the channels.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the corresponding reference signal of the same wavelength are received at the same processing component 34. Accordingly, the different processing components 34 each receives the comparative signal and the reference signal carrying the same channel.

As will be described in more detail below, the processing components 34 each combines a comparative signal with the corresponding reference signal to form a composite optical signal that carries LIDAR data for a sample region on the field of view. Accordingly, the composite optical signal can be processed so as to extract LIDAR data for a sample region.

The LIDAR chip can include a control branch 55 for controlling operation of the light source 10. The control branch 55 includes a directional coupler 56 that moves a portion of the outgoing LIDAR signal from the utility waveguide 12 onto a control waveguide 58. The coupled portion of the outgoing LIDAR signal serves as a tapped signal. Although FIG. 1 illustrates a directional coupler 56 moving portion of the outgoing LIDAR signal onto the control waveguide 58, other signal-tapping components can be used to move a portion of the outgoing LIDAR signal from the utility waveguide 12 onto the control waveguide 58. Examples of suitable signal tapping components include, but are not limited to, y-junctions, and MMIs.

The control waveguide 58 carries the tapped signal to control components 60. The control components 60 can be in electrical communication with electronics 62. During operation, the electronics 62 can adjust the frequency of the channels in the outgoing LIDAR signal in response to output from the control components. An example of a suitable construction of control components is provided in U.S. patent application Ser. No. 15/977,957, filed on 11 May 2018, entitled "Optical Sensor Chip," and in U.S. patent application Ser. No. 17/351,170, filed on 17 Jun. 2021, entitled "Scanning Multiple LIDAR System Output Signals," each of which is incorporated herein in its entirety.

Figure 2:
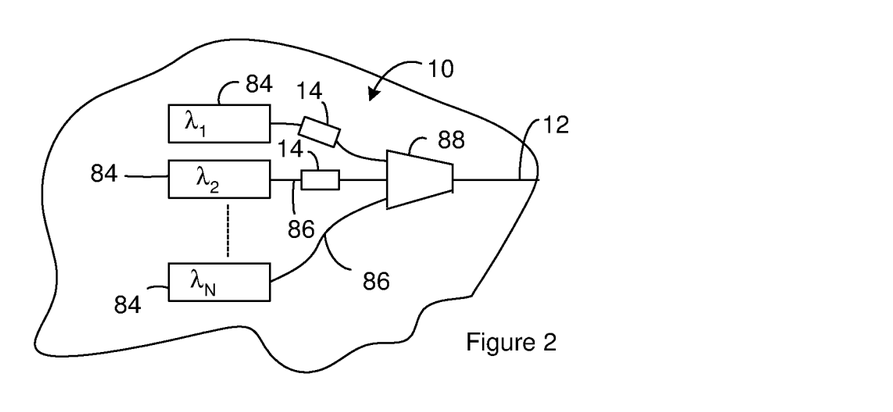
FIG. 2 illustrates a light source that includes multiple laser sources.

As noted above, one or more of the light sources 10 can be a comb laser. However, other constructions of the light source 10 are possible. For instance, FIG. 2 illustrates an example of a light source 10 that includes multiple laser sources 84. In some instances, each of the laser sources 84 outputs one or more of the channels on a source waveguide 86. The source waveguides 86 carry the channels to a laser multiplexer 88 that combines the channels so as to form a light signal that is received on a channel waveguide or the utility waveguide 12. Suitable laser multiplexers 88 include, but are not limited to, Arrayed Waveguide Grating (AWG) multiplexers, echelle grating multiplexers, and star couplers. The electronics can operate the laser sources 84 so the laser sources 84 concurrently output each of the channels. The electronics can operate the laser sources 84 so the laser sources 84 concurrently output each of the channels.

In some instances, each of the laser sources 84 outputs one of the channels on a source waveguide 86. In some instances, total number of laser sources 84 included in the light source 10 is equal to the number of LIDAR output signals that are concurrently directed to a sample region. As a result, each laser sources 84 can be the source of a different one of the channels that are concurrently directed to a sample region.

The electronics can operate the laser sources 84 independently. For instance, the electronics can operate the laser sources 84 so as to provide the LIDAR output signals with a particular frequency versus time waveform. Since the electronics can operate the laser sources 84 independently and each laser sources 84 can be the source of a different one of the LIDAR channels, the electronics can operate the laser sources 84 so different LIDAR output signals have different frequency versus time waveforms.

Suitable laser sources 84 for use with a light source 10 constructed according to FIG. 2 include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

In some instances, a LIDAR chip constructed according to FIG. 1 is used in conjunction with a LIDAR adapter. In some instances, the LIDAR adapter can be physically optically positioned between the LIDAR chip and the one or more reflecting objects and/or the field of view in that an optical path that the LIDAR input signal(s) and/or the LIDAR output signals travels from the LIDAR chip to the field of view passes through the LIDAR adapter. Additionally, the LIDAR adapter can be configured to operate on light from the system return signal and light from the LIDAR output signal such that the LIDAR input signal and the LIDAR output signal travel on different optical pathways between the LIDAR adapter and the LIDAR chip but on the same optical pathway between the LIDAR adapter and a reflecting object in the field of view.

Figure 3:
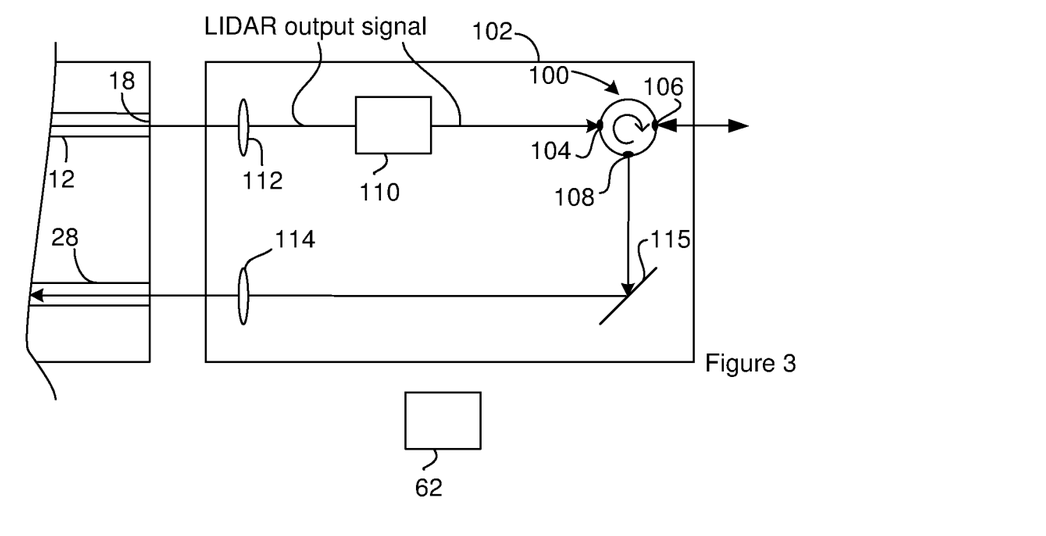
FIG. 3 is a schematic of a LIDAR adapter that is suitable for use with the LIDAR chip of FIG. 1.

An example of a LIDAR adapter that is suitable for use with the LIDAR chip of FIG. 1 is illustrated in FIG. 3. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 11 of the LIDAR chip and exits from the second port 106 as an assembly output signal.

The assembly output signal includes, consists of, or consists essentially of light from the LIDAR output signal received from the LIDAR chip. Accordingly, the assembly output signal may be the same or substantially the same as the LIDAR output signal received from the LIDAR chip. However, there may be differences between the assembly output signal and the LIDAR output signal received from the LIDAR chip. For instance, the LIDAR output signal can experience optical loss as it travels through the LIDAR adapter and/or the LIDAR adapter can optionally include an amplifier 110 configured to amplify the LIDAR output signal as it travels through the LIDAR adapter.

When one or more objects in the sample region reflect light from the assembly output signal, at least a portion of the reflected light travels back to the circulator 100 as an assembly return signal. At least a portion of the light from the assembly return signal enters the circulator 100 through the second port 106. FIG. 3 illustrates the LIDAR output signal and the assembly return signal traveling between the LIDAR adapter and the sample region along the same optical path.

The assembly return signal exits the circulator 100 through the third port 108 and is directed to the comparative signal waveguide 28 on the LIDAR chip. Accordingly, light from the assembly returned signal can serve as the LIDAR input signal and the LIDAR input signal includes or consists of light from the assembly return signal. Accordingly, the LIDAR output signal and the LIDAR input signal travel between the LIDAR adapter and the LIDAR chip along different optical paths.

As is evident from FIG. 3, the LIDAR adapter can optionally include optical components in addition to the circulator 100. For instance, the LIDAR adapter can include components for directing and controlling the optical path of the LIDAR output signal and the LIDAR return signal. As an example, the adapter of FIG. 3 optionally includes an optional amplifier 110 positioned so as to receive and amplify the LIDAR output signal before the LIDAR output signal enters the circulator 100. The amplifier 110 and/or the amplifier 16 can be operated by electronics 62 allowing the electronics 62 to control the power of the LIDAR output signal.

The optical components can include one or more beam-shaping components. For instance, FIG. 3 illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the assembly return signal at a desired location.

For instance, the second lens 114 can be configured to couple the assembly return signal to the comparative signal waveguide 28.

The LIDAR adapter can also include one or more direction changing components such as mirrors or prisms. FIG. 3 illustrates the LIDAR adapter including a mirror 115 as a direction-changing component 115 that redirects the assembly return signal from the circulator 100 to a facet of the comparative signal waveguide 28.

When the LIDAR system includes a LIDAR chip and a LIDAR adapter, the LIDAR chip, electronics, and the LIDAR adapter can be included in a LIDAR assembly where the LIDAR chip, the LIDAR adapter, and all or a portion of the electronics are positioned on a common mount 128. Suitable common mounts 128 include, but are not limited to, glass plates, metal plates, silicon plates and ceramic plates. As an example, FIG. 4 is a topview of a LIDAR system that includes the LIDAR chip and electronics 62 of FIG. 1 and the LIDAR adapter of FIG. 3 on a common mount 128.

Figure 4:
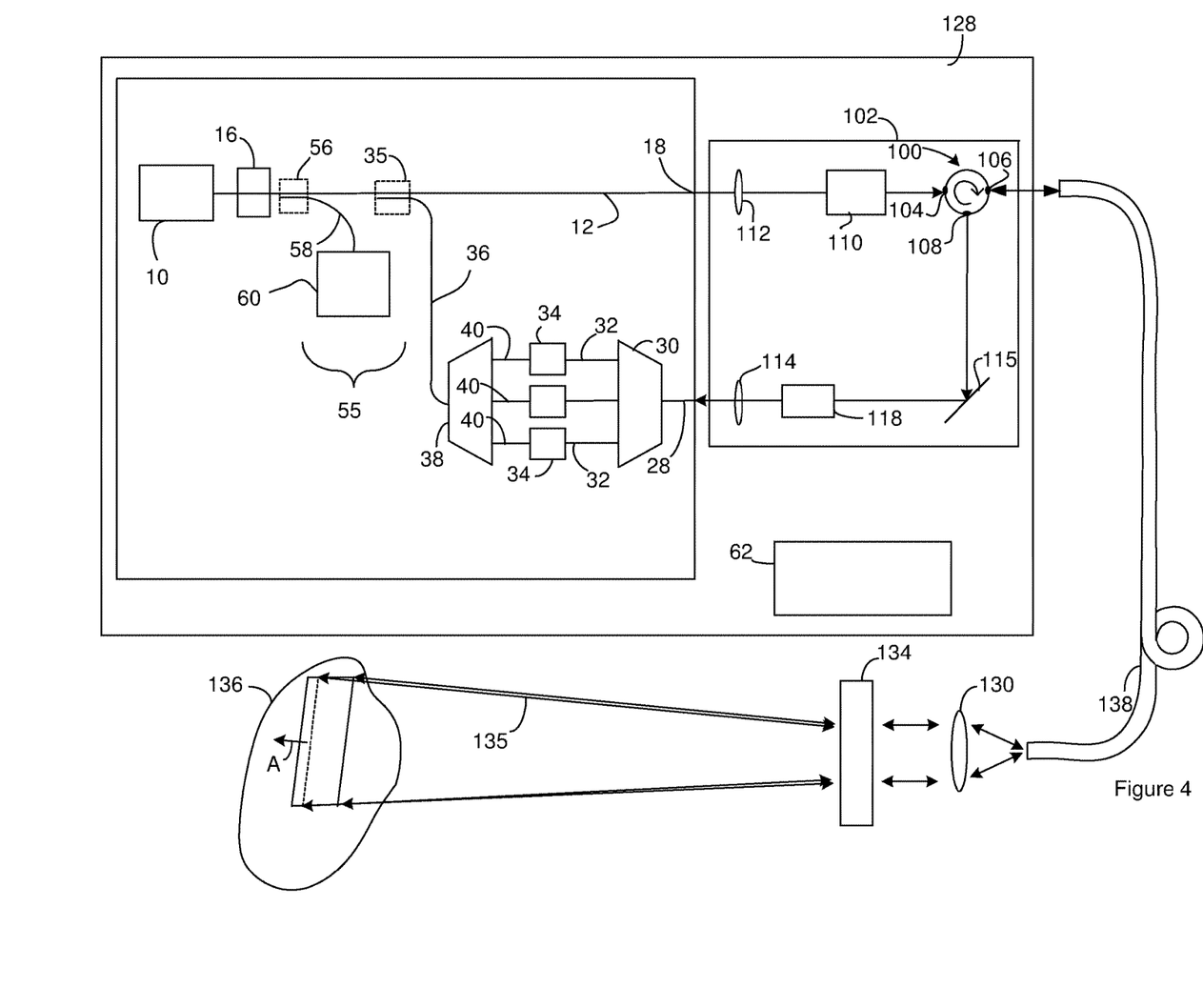
FIG. 4 is a schematic of a LIDAR system that includes a LIDAR chip constructed according to FIG. 1 and a LIDAR adapter constructed according to FIG. 3.

Although FIG. 4 illustrates the electronics 62 as located on the common mount 128, all or a portion of the electronics can be located off the common mount 128. When the light source 10 is located off the LIDAR chip, the light source can be located on the common mount 128 or off of the common mount 128. Suitable approaches for mounting the LIDAR chip, electronics, and/or the LIDAR adapter on the common mount 128 include, but are not limited to, epoxy, solder, and mechanical clamping.

The LIDAR systems of FIG. 4 can include one or more system components that are at least partially located off the common mount 128. Examples of suitable system components include, but are not limited to, optical links, beam-shaping components, polarization state rotators, beam steering components, optical splitters, optical amplifiers, and optical attenuators. For instance, the LIDAR systems of FIG. 4 can include one or more beam-shaping components 130 that receive the assembly output signal from the adapter and output a shaped signal. The one or more beam-shaping components 130 can be configured to provide the shaped signal with the desired shape. For instance, the one or more beam-shaping components 130 can be configured to output a shaped signal that focused, diverging or collimated. In FIG. 4, the one or more beam-shaping components 130 is a lens that is configured to output a collimated shaped signal.

The LIDAR systems of FIG. 4 can optionally include one or more beam steering components 134 that receive the shaped signal from the one or more beam-shaping components 130 and that output the system output signal. For instance, FIG. 4 illustrates a beam steering component 134 that receive the shaped signal from a beam-shaping component 130. The electronics can operate the one or more beam steering components 134 so as to steer the system output signal to different sample regions 135. The one or more beam steering components 134 can be configured such that each of the channels in the system output signal travels away from the LIDAR system in the same direction or in substantially the same direction. As a result, each of the channels in the system output signal can be concurrently directed to a sample region.

The sample regions can extend away from the LIDAR system to a maximum distance for which the LIDAR system is configured to provide reliable LIDAR data (the minimum operational distance). The one or more beam steering components 134 can continue to scan the system output signal while the system output signal illuminates a portion of a sample region. As an example, FIG. 4 illustrates the system output signal being scanned in the direction of the arrow labeled A. The sample regions can be stitched together to define the field of view for the LIDAR system. For instance, the field of view of for the LIDAR system includes or consists of the space occupied by the combination of the sample regions.

Suitable beam steering components include, but are not limited to, movable mirrors, MEMS mirrors, optical phased arrays (OPAs), optical gratings, actuated optical gratings and actuators that move the LIDAR chip, LIDAR adapter, and/or common mount 128.

When the system output signal is reflected by an object 136 located outside of the LIDAR system and the LIDAR, at least a portion of the reflected light returns to the LIDAR system as a system return signal. When the LIDAR system includes one or more beam steering components 134, the one or more beam steering components 134 can receive at least a portion of the system return signal from the object 136. The one or more beam-shaping components 130 can receive at least a portion of the system return signal from the object 136 or from the one or more beam steering components 134 and can output the assembly return signal that is received by the adapter.

The LIDAR systems of FIG. 4 include an optional optical link 138 that carries optical signals to the one or more system components from the adapter, from the LIDAR chip, and/or from one or more components on the common mount. For instance, the LIDAR systems of FIG. 4 includes an optical fiber configured to carry the assembly output signal to the beam-shaping components 130. The use of the optical link 138 allows the source of the system output signal to be located remote from the LIDAR chip. Although the illustrated optical link 138 is an optical fiber, other optical links 138 can be used. Other suitable optical links 138 include, but are not limited to, free space optical links and waveguides. When the LIDAR system excludes an optical link, the one or more beam-shaping components 130 can receive the assembly output signal directly from the adapter.

Figure 5A:
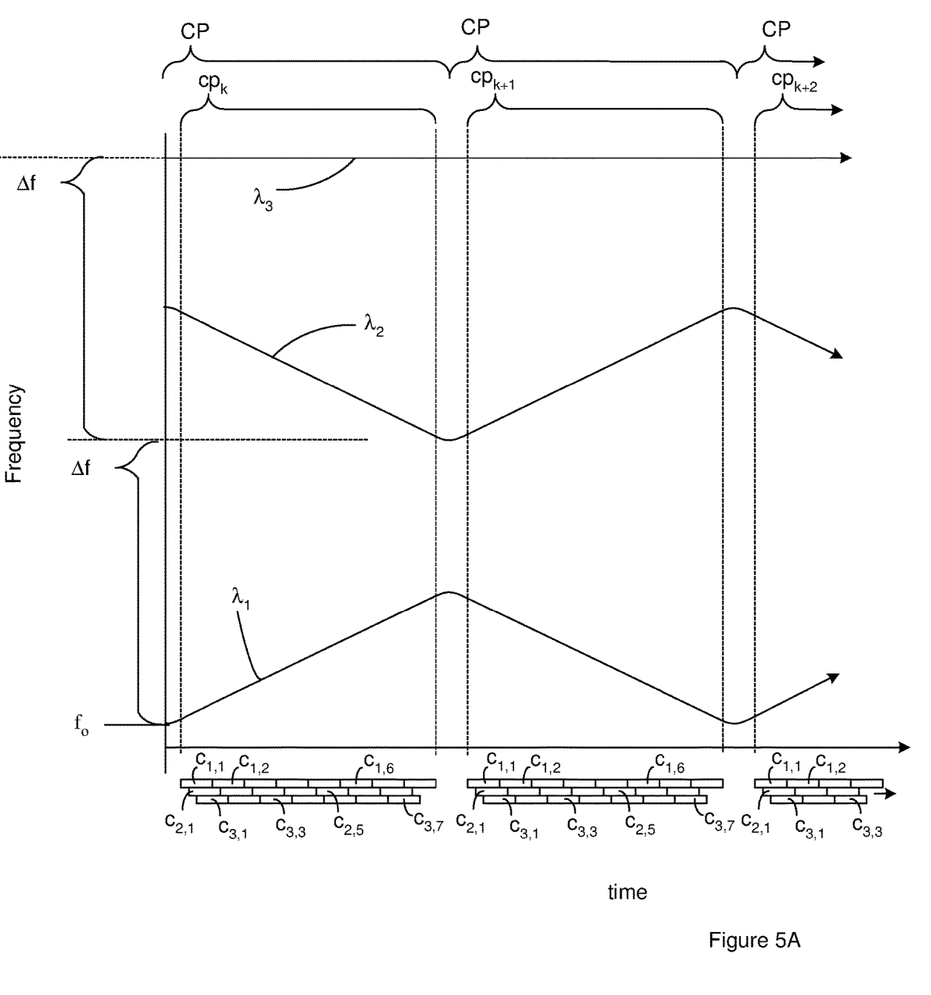
FIG. 5A illustrates a frequency versus time scheme for use with LIDAR output signals for a LIDAR system according to FIG. 4.
Figure 5B:
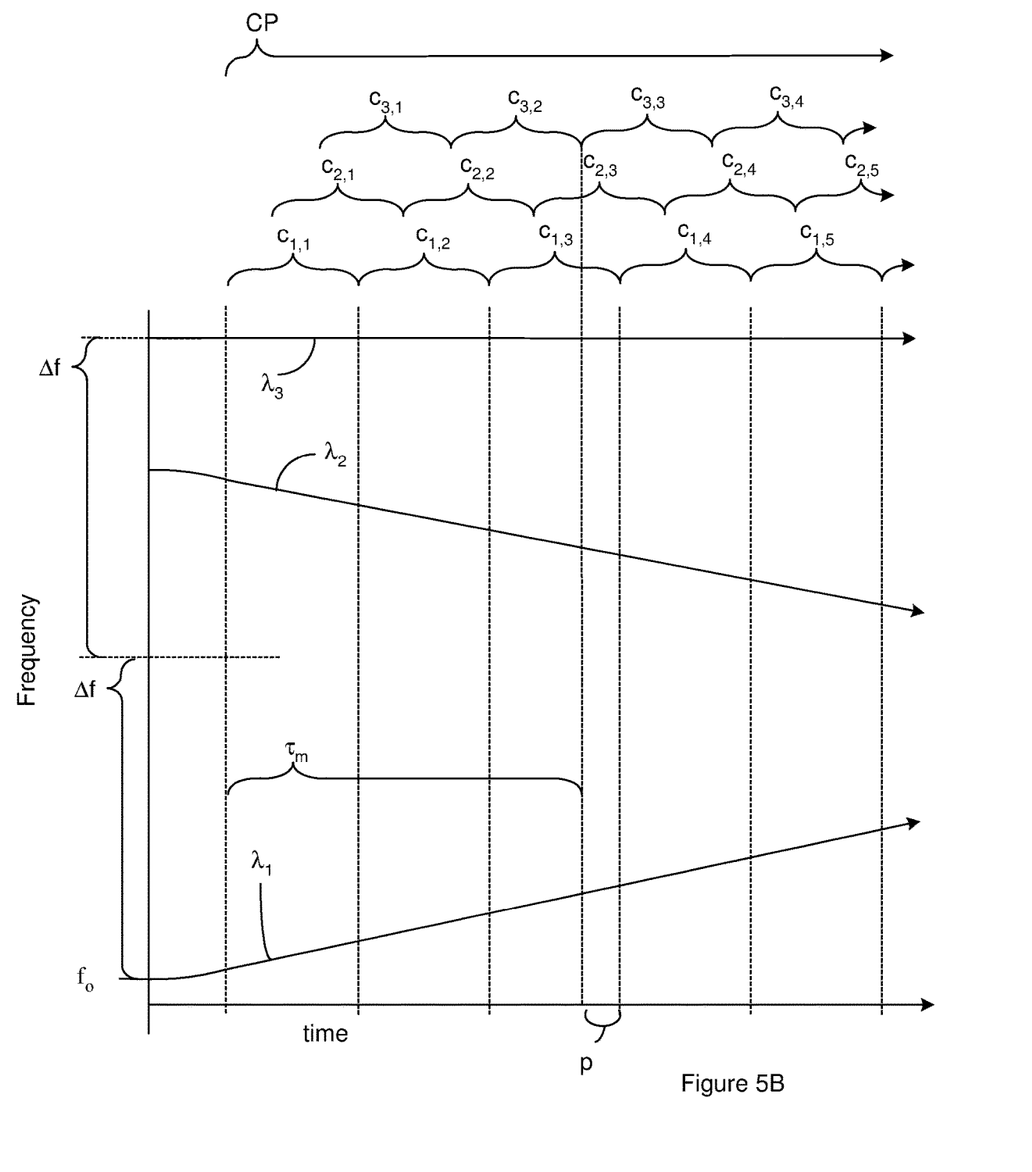
FIG. 5B is a magnified view of a portion of the frequency versus time scheme shown in FIG. 5A.

During operation of the LIDAR system, the electronics chirp the frequency of one or more of the channels in the system output signal. FIG. 5A and FIG. 5B provide an example of a frequency versus time schedule for tuning the channels in the system output signal. The system output signal is illustrated as carrying channels labeled $\lambda_i$ where i is a channel index with a value from 1 to N where N=3 in this example. In some instances, the base frequencies of the channels are separated by $\Delta f$. The frequencies are tuned such that there is no overlap in the frequencies of the different channels. The system output signals $\lambda 1$ and $\lambda 2$ each has a chirped frequency in that the frequency changes with time. The chirp of the system output signals $\lambda 1$ and $\lambda 2$ is done for a series of chirp cycles that each has a duration labeled CP. FIG. 5B is a magnified version of the frequency versus time schedule shown in FIG. 5A showing only a portion of one of the chirp cycles shown in FIG. 5A.

The chirp of the system output signals $\lambda 1$ and $\lambda 2$ during a chirp cycle can be an upward chirp where the frequency increases or a downward chirp where the frequency decreases. The chirp of a system output signal $\lambda 1$ or $\lambda 2$ during a chirp cycle has a linear chirp section between non-linear chirp sections. The non-linear chirp section may be a product of changing chirp direction at the interface between chirp cycles. The duration of the linear chirp sections is labeled $cp_n$ in FIG. 5A where n is a cycle index. In some instance, the duration of the linear chirp section is greater than 5 µs, 10 µs, or 100 µs and/or less than 200 µs, 500 µs, or 1000 µs. In some instance, the duration of the linear chirp section is more than 5, 10, or 100 and/or less than 200, 500, or 1000 times a total duration of the one or more non-linear chirp sections included in the chirp cycles.

During the same chirp cycle, the frequency change for $\lambda 1$ and $\lambda 2$ is in the opposite direction but at the same rate. As a result, a sample region is concurrently illuminated by at least one channel with an increasing frequency and at least one channel with a decreasing frequency where the rate of the frequency change is the same.

The channel labeled $\lambda 3$ is optional. Although the LIDAR output signal labeled $\lambda 3$ is shown with an unchirped frequency, the LIDAR output signal labeled $\lambda 3$ can have a chirped or unchirped frequency. When the LIDAR output signal $\lambda 3$ has a chirped frequency, the rate and/or direction of the frequency chirp can be different from the rate and direction of the frequency chirp of the LIDAR output signals $\lambda 1$ and also from the rate and direction of the frequency chirp of the LIDAR output signals $\lambda 2$.

The generation of LIDAR data is divided into sample periods. The composite optical signals that are generated during the sample period are used to generate LIDAR data for each of the sample periods. The LIDAR data for a sample period indicates the radial velocity and/or distance between the LIDAR system and one or more objects that reflects light that is included in the composite optical signal during the sample period. The different sample periods are each labeled $C_{j,k}$ in FIG. 5A where j represents a transform index with a value from 1 to J where J can be 1 and k is a sample period index with values greater than or equal to 1. Sample periods with the same transform index and in the same chirp cycle can occur in series. In some instances, there is no delay or substantially no delay between sample periods that are adjacent to one another in time in the same chirp cycle and have the same transform index. The sample period indices for sample periods with the same transform index and in the same chirp cycle can increase sequentially with time as shown in FIG. 5A. As a result, sample regions with the same sample period index (k) can overlap. As is evident in FIG. 5A, the values of the sample period indices can return to 1 at the start of a new chirp cycle.

The sample periods can each have the same or substantially the same duration. The sample periods can be in an overlapping arrangement. In some instances, each of the sample periods is overlapped by at least J–1 other sample periods as is evident in FIG. 5A and FIG. 5B. Since composite optical signals generated during overlapping sample periods are used to generate LIDAR data, the same portion of a composite optical signals can be used to generate the LIDAR data for different sample periods. For instance, the portion of the composite optical signal labeled p in FIG. 5B can be used to generate the LIDAR data for the sample periods labeled $C_{1,3}$, $C_{2,3}$ and $C_{3,3}$.

In some instances, the duration of the sample period is greater than 1 μs, 2 μs, or 4 μs and/or less than 5 μs, 10 μs, or 100 μs. Additionally or alternately, the duration of the linear chirp section can be more than 2, 5, or 10 and/or less than 20, 100, or 200 times a duration of each one of at least a portion of the sample periods. As is evident from FIG. 5A, the number of sample periods during each of the linear chirp sections exceeds a value of the duration of the linear chirp section divided by the duration of each of the sample periods. For instance, the number of sample periods during each of the linear chirp sections can be more than 1, 5, or 10 times the value of the duration of the linear chirp section divided by the duration of each of the sample periods.

The LIDAR system is typically configured to provide reliable LIDAR data when the object is within an operational distance range from the LIDAR system. The operational distance range can extend from a minimum operational distance to a maximum operational distance. A maximum roundtrip time can be the time required for a system output signal to exit the LIDAR system, travel the maximum operational distance to the object with a surface at the maximum operational distance and to return to the LIDAR system. An example of a possible maximum roundtrip time is labeled $\tau_M$ in FIG. 5B. When an object has a surface positioned at the maximum operational distance, the system return signal that results from that surface will not return to the LIDAR system until the maximum roundtrip time has passed. As a result, when an object has a surface positioned at the maximum operational distance, the LIDAR system will not generate a composite optical signal from that surface until the start of the sample period labeled $C_{3,3}$ in FIG. 5B. Accordingly, the duration of three sample periods passes before LIDAR data can be generated for a surface positioned at the maximum operational distance. However, when an object has a surface positioned at a distance that is less than maximum operational distance from the LIDAR system, LIDAR data can be generated earlier. For instance, an object can be positioned close enough to the LIDAR system that composite optical signals from that object occur sufficiently early to generate LIDAR data in the sample period labeled $C_{2,1}$ or even $C_{1,1}$. The duration of the sample period can be greater than 0.1, 0.2, or 0.3 of the maximum roundtrip time and less than 0.5, 0.7, or 0.9 of the maximum roundtrip time.

As noted above, the system output signal can be steered to different sample regions in the LIDAR systems field of view. The sample regions can each be associated with one of the sample periods. For instance, a sample region can be the volume of the field of view that can be illuminated by the system output signal and yield light that is included in the composite optical signal that is used to generate LIDAR data for that sample region. Since the maximum roundtrip time can be longer than the sample period, the period of time for which a sample region is illuminated by the system output signal can be longer than the sample period. As a result, LIDAR data for a sample period can represent distance and/or radial velocity for an object that was illuminated by the system output signal before the sample period.

One example of a LIDAR system includes a light source constructed according to FIG. 2 where the light source is configured to generate two LIDAR output signals. One of the LIDAR output signals carries a channel with a frequency versus time according to channel $\lambda 1$ of FIG. 5A and FIG. 5B and the other LIDAR output signal carries a channel with a frequency versus time according to channel $\lambda 2$ of FIG. 5A and FIG. 5B. Accordingly, the LIDAR system can be constructed according to FIG. 1 with two processing components 34. Another example of a LIDAR system includes a light source constructed according to FIG. 2 where the light source is configured to generate three LIDAR output signals. One of the LIDAR output signals carries a channel with a frequency versus time according to channel $\lambda 1$ of FIG. 5A and FIG. 5B, another LIDAR output signal carries a channel with a frequency versus time according to channel $\lambda 2$ of FIG. 5A and FIG. 5B, and another LIDAR output signal carries a channel with a frequency versus time according to channel $\lambda 3$ of FIG. 5A and FIG. 5B. Accordingly, the LIDAR system can be constructed according to FIG. 1 with three processing components 34. As is evident from these examples, the number of processing components 34 included in the LIDAR system can match the number of channels carried in the system output signal. Although FIG.

5A and FIG. 5B illustrate a frequency versus time waveform for three different channels, the LIDAR system can be configured to output more than three LIDAR output signals that each carries a different channel.

Although FIG. 5A and FIG. 5B illustrate the sample periods arranged with a transform index (J) greater than 1, the transform index (J) can be 1. As a result, the sample periods need not overlap and can be arranged in series.

Figure 6A:
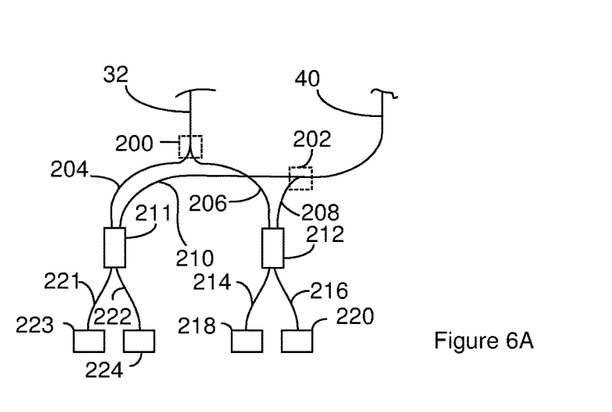
FIG. 6A is a schematic of an example of a suitable optical-to-electrical assembly for use in a processing component.
Figure 6B:
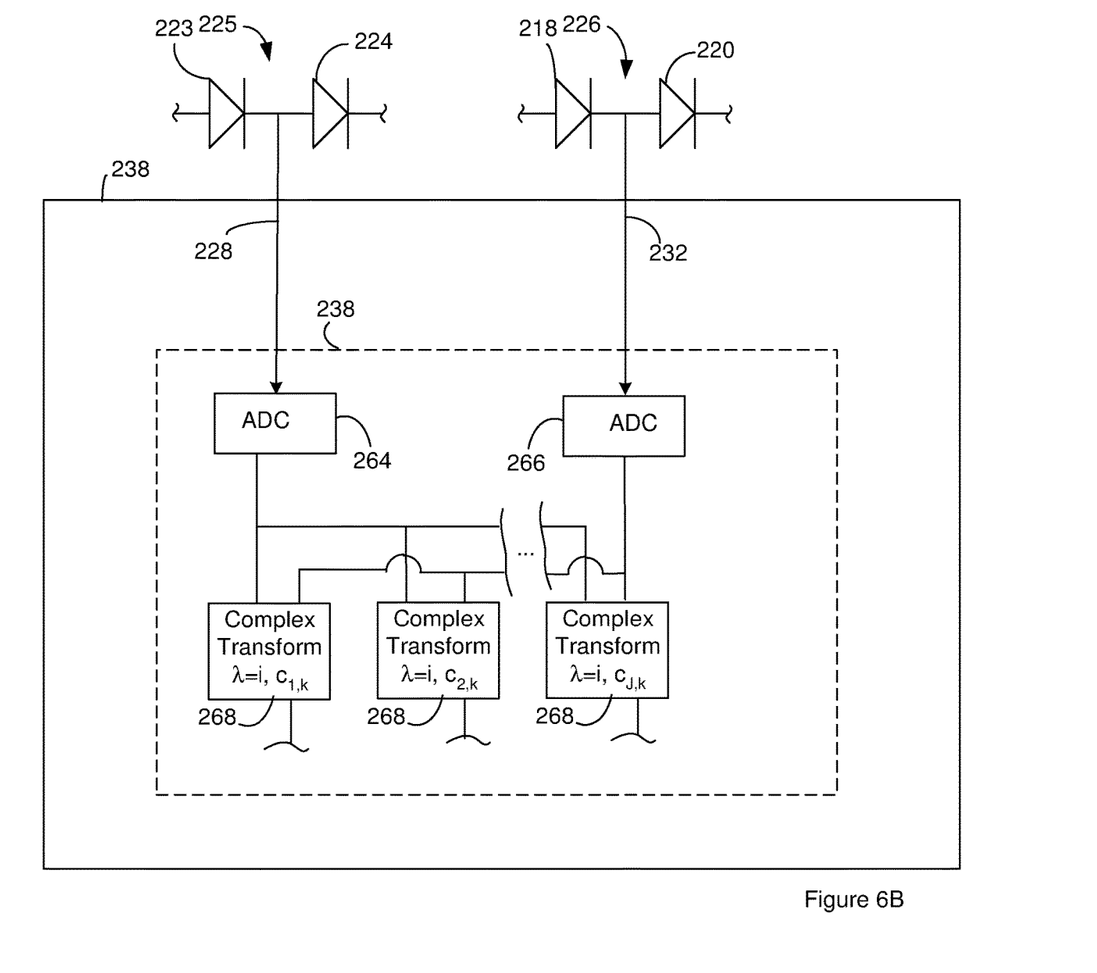
FIG. 6B provides a schematic of the relationship between the light sensors and a portion of electronics associated with a processing component.

FIG. 6A through FIG. 6B illustrate an example of suitable processing components 34 for use as any of processing components 34 in a LIDAR system constructed according to FIG. 1. The processing component 34 includes an optical-to-electrical assembly configured to convert the light signals to electrical signals. FIG. 6A is a schematic of an example of a suitable optical-to-electrical assembly that includes a first splitter 200 that divides the comparative signal received from the comparative waveguides 32 onto a first comparative waveguide 204 and a second comparative waveguide 206. The first comparative waveguide 204 carries a first portion of the comparative signal to a light-combining component 211. The second comparative waveguide 206 carries a second portion of the comparative signal to a second light-combining component 212.

The processing component of FIG. 6A also includes a second splitter 202 that divides the reference signal received from the reference waveguides 40 onto a first reference waveguide 210 and a second reference waveguide 208. The first reference waveguide 210 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 6B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 6B are included on the LIDAR chip. In some instances, the components illustrated in the schematic of FIG. 6B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes one or more transform components 268 that each receives the complex data signal. For instance, the electronics connect the transform components 268, the first Analog-to-Digital Converter (ADC) 264, and the second Analog-to-Digital Converter (ADC) 266 such that each of transform component 268 labeled $\lambda=i$, $c_{1,k}$ through the transform component 268 labeled $\lambda=i$, $c_{J,k}$ in FIG. 6B each receives the complex data signal. In particular, each of the transform components 268 labeled $\lambda=i$, $c_{1,k}$ through $\lambda=i$, $c_{J,k}$ receives the first digital data signal from the first Analog-to-Digital Converter (ADC) 264 as an input and also receives the second digital data signal from the first Analog-to-Digital Converter (ADC) 266 as an input. The transform index value of J in the transform component 268 labeled $\lambda=i$, $c_{j,k}$ represents the number of transform components 268 that receive the complex data signal. Since each of the processing components 34 receives a comparative signal and a reference signal carrying the same channel, the channel index i shown on each of the transform components 268 (i.e. $\lambda=i$,) is the same and represents the channel received by the processing components 34 that includes the illustrated transform mechanism 238.

Each of the transform component 268 can be configured to perform a mathematical transform on the complex signal so as to convert from the time domain to the frequency domain. However, different transform components 268 perform the mathematical transform on different time segments of the complex signal. For instance, the transform component 268 labeled $\lambda=i$, $c_{i,k}$ performs the mathematical transform on the portion of the complex signal associated with the composite optical signal during sample period $c_{i,k}$. As an example, the transform component 268 labeled $\lambda=i$, $c_{i,k}$ performs the mathematical transform on the portion of the complex signal generated from the composite optical signal during sample period $c_{i,k}$. In a particular example, a transform component 268 that performs the mathematical transform on the segment of the complex signal that carries channel $\lambda=1$ and results from the composite optical signal during sample period $c_{2,3}$ would be labeled $\lambda=1$, $c_{2,3}$ but the transform component 268 that performs the mathematical transform on the segment of the complex signal that carries channel $\lambda=1$ and results from the composite optical signal during sample period $c_{1,3}$ would be labeled $\lambda=1$, $c_{1,3}$.

Each of the transform components 268 processes the sample periods in series. For instance, each of the transform components 268 processes the sample periods with the same transform index in the order of increasing sample period index (k in Cj,k). As a result, sample periods that can be arranged in series, without overlap between adjacent sample periods, and with the shortest delay or no delay between adjacent sample periods can be processed by the same transform component and can accordingly have the same transform index.

The transform mechanism 238 includes multiple peak finders 270 that each receives output from a different one of the transform component 268. The peak finders 270 are configured to find a peak in output of the transform component 268 in order to identify one or more peaks in the beat frequency of the composite optical signal. The mathematical transform can be a complex transform such as a complex Fast Fourier Transform (FFT). A complex transform such as a complex Fast Fourier Transform (FFT) provides an unambiguous solution for the beat frequency of the composite optical signal.

Figure 6C:
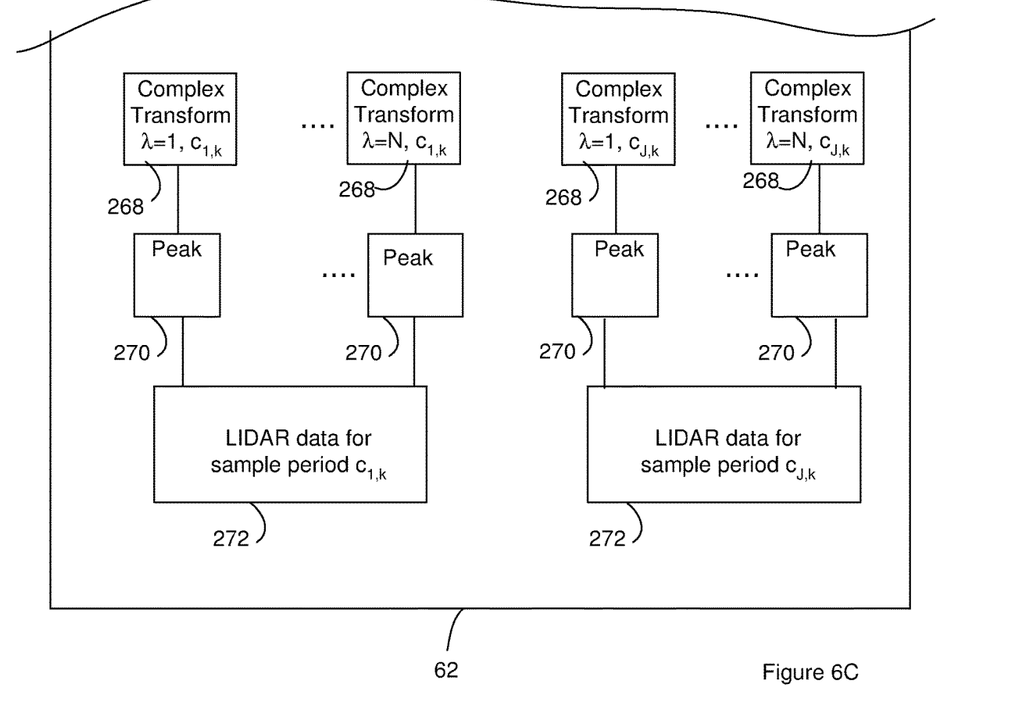
FIG. 6C illustrates a portion of the electronics that combine output different processing components.

The electronics are configured to combine the output from different processing components 34 to generate the LIDAR data. For instance, the electronics can combine the beat frequencies from different processing components 34 to generate the LIDAR data. In particular, the electronics can combine the beat frequencies of different channels during the same sample period to generate the LIDAR data for the sample period. For instance, FIG. 6C illustrates a portion of the electronics that includes the transform components 268 that operate on signals carrying different channels. In contrast, the transform components 268 in FIG. 6B are included in the same processing component and each operate on signals carrying the same channel.

In FIG. 6C, each of the peak finders 270 receives output from a different one of the transform component 268 and outputs a beat frequency that is associated with a particular one of the channels and a particular one of the sample periods.

The electronics include multiple LIDAR data generators 272. Each of the LIDAR data generators 272 receives beat frequencies from multiple peak finders 270. For instance, the electronics are configured such that each of the LIDAR data generators 272 receives the beat frequency that occurs for each of the channels l=1 during the same sample period.

Each of the LIDAR data generators 272 combines the beat frequency that occurs for each of the channels l=1 during the same sample period to generate the LIDAR data for that sample period. For instance, the following equation applies to a channel where the frequency of the system output signal carrying that channel increases during the sample period such as occurs with the LIDAR output signal $\lambda_1$ of FIG. 5A during sample period $c_{2,5}$: $+f_{ub}=-f_d+\alpha\tau_0$ where $f_{ub}$ is the beat frequency that one of the peak finders outputs for the channel during the sample period, $f_d$ represents the Doppler shift ($f_d=2vf_c/c$) where $f_c$ is the frequency of the LIDAR output signal at the start of the sample period, v is the radial velocity between the reflecting object and the LIDAR chip where the direction from the reflecting object toward the chip is assumed to be the positive direction, and c is the speed of light, $\alpha$ represents the rate at which the frequency of the outgoing LIDAR signal is increased or decreased during the sample period, and $\tau_0$ is the roundtrip delay (time between the system output signal exiting from the LIDAR system and the system return signal returning to the LIDAR system) for a stationary reflecting object. The following equation applies to a channel where the frequency of the system output signal carrying that channel decreases during the sample period such as occurs with the LIDAR output signal $\lambda_2$ of FIG. 5A during sample period $c_{2,5}$: $-f_{db}=-f_d-\alpha\tau_0$ where $f_{db}$ is the beat frequency that one of the peak finders outputs for the channel during the sample period. In these two equations, $f_d$ and $\tau_0$ are unknowns. These two equations are solved for the two unknowns $f_d$ and $\tau_0$. The values of $f_{db}$ and $f_{ub}$ that are substituted into the solution come from different processing components (labeled 34 in FIG. 1) because the value of $f_{db}$ is generated from a LIDAR output signal carrying a different channel than the LIDAR output signal from which the value of $f_{ub}$ is generated. The different channels are concurrently incident on the same sample region(s) during the same cycle. The radial velocity for a sample period can then be determined from the Doppler shift ($v=c*f_d/(2f_c)$) and the separation distance for that sample region can be determined from $c*\tau_0/2$. As a result, the LIDAR data for a single sample period can be determined using channels received at different processing components.

As noted above, the LIDAR system can be configured to operate at a maximum operational distance. When generating the LIDAR data, the electronics can filter out beat frequencies that are output from a peak finder with frequency above a threshold associated with the maximum operational distance. For instance, the electronics can disregard beat frequencies that are output from a peak finder with frequency above the threshold.

As discussed above, the LIDAR system can output a system output signal that carries two or more channels. For instance, the LIDAR system can carry three channels that have frequency versus time waveforms according to FIG. 5A and FIG. 5B. This may be desirable in situations where a composite optical signal carries light reflected by multiple different objects during a sample period. Different reflecting objects in a sample region need not be physically separate items but can be different surfaces of the same item that are located different distances from the LIDAR system and/or are moving at different radial velocities relative to the LIDAR system as might occur with a jagged object that is both rotating and translating relative to the LIDAR system.

In situations where a composite optical signal carries light reflected by multiple different objects during a sample period, a transform components 268 can output more than one frequency value where each of the different frequency values is associated with a different one of the reflecting objects. In these instances, it may be necessary to match the beat frequencies provided by the peak finders 270 in different processing components. The matching is performed such that the matched frequencies are frequencies from the same reflecting object. The use of additional channels such as $\lambda 3$ can be used to match frequencies. LIDAR data can be generated for each pair of matched frequencies and is considered and/or processed as the LIDAR data for the different reflecting objects.

One example of a LIDAR system includes a light source configured to generate a system output signal carrying three channels. One of the system output signals carries a channel with a frequency versus time according to channel $\lambda_1$ of FIG. 5A, another LIDAR output signal carries a channel with a frequency versus time according to channel $\lambda_2$ of FIG. 5A, and another LIDAR output signal carries a channel with a frequency versus time according to channel $\lambda_3$ of FIG. 5A. In this instance, the beat frequency output from the peak finders associated with the processing component that receives the channel $\lambda_3$ is: $f_3 = -f_d + \alpha''\tau_0$ where $f_d$ represents the Doppler shift, $\alpha''$ represents the rate at which the frequency of the LIDAR output signal $\lambda_3$ is increased or decreased during the sample period, and $\tau_0$ is the roundtrip delay. When the frequency versus time for $\lambda_3$ is according to FIG. 5B, $\alpha''=0$ and this equation reduces to $f_3 = -f_d$. The equation for $f_3$ can be used to generate a theoretical $f_3$ for at least a portion of the possible frequency pairs and the theoretical $f_3$ values can be compared to the actual $f_3$ values provided by the peak finders associated with the processing component that receives the channel $\lambda_3$. The frequency pair that provides a theoretical $f_3$ value closest to the actual $f_3$ value is considered a matching pair. LIDAR data can be generated for each of the matching pairs and the LIDAR data from the matching pairs can be considered and/or processed as the LIDAR data for each of the different reflecting objects in the sample region.

As one example of the identification of matching pairs, the transform components 168 associated with the processing component that receives the channel $\lambda_1$ outputs two different frequencies for $f_{db}$: $f_{d11}$ and $f_{d12}$. Additionally, the peak finders associated with the processing component that receives the channel $\lambda_2$ outputs two different frequencies for fa: fan and fan. In this instance, the possible frequency pairings are: $(f_{d11}, f_{d21})$; $(f_{d11}, f_{d22})$; $(f_{d12}, f_{d21})$; and $(f_{d12}, f_{d22})$. A value of $f_d$ and $\tau_0$ can be calculated for each of the four possible frequency pairings as described above. Each pair of values for $f_d$ and $\tau_0$ can be substituted into $f_3 = -f_d + \alpha''\tau_0$ to generate a theoretical $f_3$ for each of the possible frequency pairings. As noted above, when $\alpha''=0$, the equation reduces to $f_2 = -f_d$. In these instances, there is no need to calculate $\tau_0$ for the possible frequency pairings. The transform components 168 associated with the processing component that receives the channel $\lambda_3$ also outputs two values for $f_3$ that are each treated as an actual $f_3$ value. The frequency pair with a theoretical $f_3$ value closest to each of the actual $f_3$ values is considered a matching pair. LIDAR data can be generated for each of the matching pairs as described above and is considered and/or processed as the LIDAR data for a different one of the reflecting objects in the sample region.

Although the transform components 268 are disclosed as performing complex transforms on a complex signal, the complex transforms can be replaced with real transforms performed on real signals. As a result, the optical-to-electrical assembly of FIG. 6A can be simplified so as to exclude the second light-combining component 212, the comparative waveguide 206, the second splitter 202, and the second reference waveguide 208.

Figure 7:
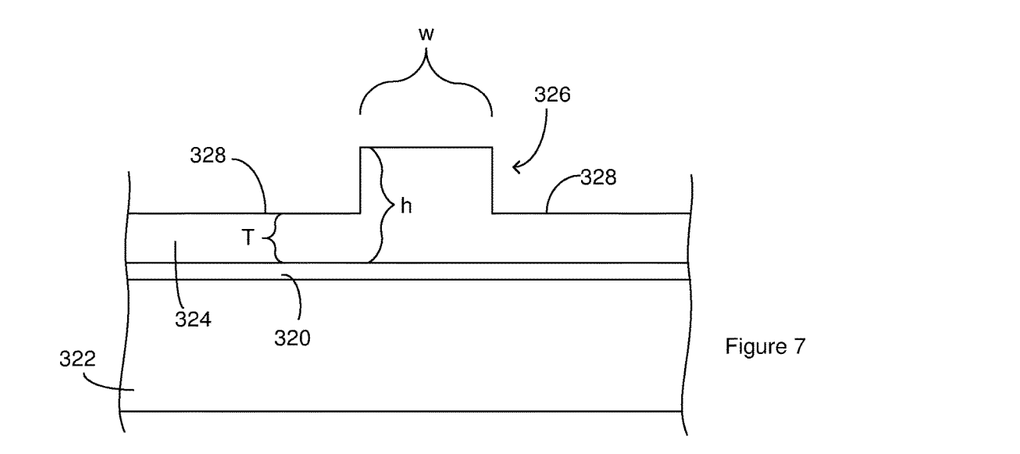
FIG. 7 is a cross-section of portion of a LIDAR chip constructed from a silicon-on-insulator wafer.

Suitable platforms for the LIDAR chips include, but are not limited to, silica, indium phosphide, and silicon-on-insulator wafers. In some instances, the wafer has a light-transmitting medium on a base. As an example, FIG. 7 is a cross-section of portion of a LIDAR chip constructed from a silicon-on-insulator wafer. A silicon-on-insulator (SOI) wafer includes a buried layer 320 included in a base 321 that has the buried layer on a substrate 322. Additionally, the wafer includes a light-transmitting medium 324 positioned on the base 321 with the buried layer 320 between the substrate 322 and the light-transmitting medium 324. In a silicon-on-insulator wafer, the buried layer is silica while the substrate and the light-transmitting medium are silicon. The substrate of an optical platform such as an SOI wafer can serve as the base for the entire chip. For instance, the optical component shown in FIG. 1 can be positioned on or over the top and/or lateral sides of the substrate.

The portion of the chip illustrated in FIG. 7 includes a waveguide construction that is suitable for use with chips constructed from silicon-on-insulator wafers. A ridge 326 of the light-transmitting medium extends away from slab regions 328 of the light-transmitting medium. The light signals are constrained between the top of the ridge and the buried oxide layer.

The dimensions of the ridge waveguide are labeled in FIG. 7. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 7 is suitable for all or a portion of the waveguides on LIDAR chips constructed according to FIG. 1 through FIG. 4.

Components on the LIDAR chip can be fully or partially integrated with the LIDAR chip. For instance, the integrated optical components can include or consist of a portion of the wafer from which the LIDAR chip is fabricated. A wafer that can serve as a platform for a LIDAR chip can include multiple layers of material. At least a portion of the different layers can be different materials. As an example, a silicon-on-insulator wafer that includes the buried layer 320 between the substrate 322 and the light-transmitting medium 324 as shown in FIG. 7. The integrated on-chip components can be formed by using etching and masking techniques to define the features of the component in the light-transmitting medium 324. For instance, the slab regions 318 that define the waveguides and the stop recess can be formed in the desired regions of the wafer using different etches of the wafer. As a result, the LIDAR chip includes a portion of the wafer and the integrated on-chip components can each include or consist of a portion of the wafer. Further, the integrated on-chip components can be configured such that light signals traveling through the component travel through one or more of the layers that were originally included in the wafer. For instance, the waveguide of FIG. 7 guides light signal through the light-transmitting medium 324 from the wafer. The integrated components can optionally include materials in addition to the materials that were present on the wafer. For instance, the integrated components can include reflective materials and/or a cladding. Examples of components that can be integrated on a platform include, but are not limited to, the reference demultiplexer 38 and the comparative demultiplexer 30. For instance, an Arrayed Waveguide Grating (AWG) and/or an echelle grating can serve as the reference demultiplexer 38 and/or the comparative demultiplexer 30 and can be integrated with the LIAR chip. For instance, the Arrayed Waveguide Grating (AWG) and/or an echelle grating can include a star coupler where light signals are guided through the light transmitting medium of the LIDAR chip.

The components on the LIDAR adapter need not be integrated. For instance, the components on the LIDAR adapter need not include materials from the base 102 and/or from the common mount. In some instances, all of the components on the LIDAR adapter and/or the isolator adapter are separate from the base 102 and/or from the common mount. For instance, the components on the LIDAR adapter can be constructed such that the light signals processed by the LIDAR adapter and/or the isolator adapter do not travel through any portion of the base 102 and/or the common mount.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor and the second light sensor.

Suitable electronics 62 for use in the LIDAR system can include, but are not limited to, a controller that includes or consists of analog electrical circuits, digital electrical circuits, processors, microprocessors, digital signal processors (DSPs), Application Specific Integrated Circuits (ASICs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Numeric labels such as first, second, third, etc. are used to distinguish different features and components and do not indicate sequence or existence of lower numbered features. For instance, a second component can exist without the presence of a first component and/or a third step can be performed before a first step.

Although the LIDAR systems are disclosed as having a light source 10 on the LIDAR chip, all or a portion of a suitable light source can be positioned off the LIDAR chip. For instance, the source waveguide 11 can terminate at a facet and light for the light source output signal can be generated by a light source off the LIDAR chip and can then enter the source waveguide 11 through the facet.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
  a LIDAR system configured to output a system output signal such that the system output signal can be reflected by an object located outside of the LIDAR system,
    the system also being configured to receive a system return signal that includes light from the reflected LIDAR output signal,
    the system return signal and the system output signal each carrying a first channel,
    the LIDAR system configured to combine light that is from the system return signal and that carries the first channel with a reference signal so as to produce a composite signal beating at a beat frequency;

electronics that operate the LIDAR system such that the first channel has a series of chirp cycles, each chirp cycle including a linear chirp section where a frequency chirp of the channel is linear, multiple different sample periods falling within each of the linear chirp sections, the electronics being configured to calculate LIDAR data for each of the sample periods, the electronics calculating the LIDAR data for a sample period from the beat frequency of the composite signal during the sample period, and the LIDAR data for a sample period indicates the radial velocity and/or distance between the LIDAR system and the object; and wherein the multiple channels include a second channel and the LIDAR chip is configured to combine light that is from the system return signal and that carries the second channel with a second reference signal so as to produce a second composite signal beating at a second beat frequency.

2. The system of claim 1, wherein the sample periods overlap one another in time.

3. The system of claim 1, wherein the electronics calculate the LIDAR data for a sample period from the beat frequency of the composite signal and the beat frequency of the second composite signal during the sample period.

4. The system of claim 1, wherein the system output signal carries the first channel and the second channel such that the first channel and the second channel travel the same direction away from the LIDAR system.

5. The system of claim 1, wherein a duration of the linear chirp section is more than 2 times a duration of each one of at least a portion of the sample periods.

6. The system of claim 5, wherein a duration of each of the sample periods is more than 1 μs and less than 10 μs.

7. The system of claim 1, wherein a number of sample periods during each of the linear chirp sections exceeds a value of a duration of the linear chirp section divided by a duration of each of the sample periods.

8. The system of claim 1, wherein the electronics use the same portion of the composite signal to calculate the LIDAR data for multiple different sample periods.

9. The system of claim 1, wherein the linear chirp sections from different chirp cycles are separated by non-linear chirp sections.

10. A method of operating a LIDAR system, comprising:
causing a system output signal to be output from the LIDAR system such that the system output signal can be reflected by an object located outside of the LIDAR system, receiving a system return signal at the LIDAR system, the system return signal including light from the reflected LIDAR output signal, the system return signal and the system output signal each carrying a first channel that has a series of chirp cycles, each chirp cycle including a linear chirp section where a frequency chirp of the channel is linear, and the system return signal and the system output signal each carrying a second channel;

combining light that is from the system return signal and that carries the first channel with a reference signal so as to produce a composite signal beating at a beat frequency;

combining light that is from the system return signal and that carries the second channel with a second reference signal so as to produce a second composite signal beating at a second beat frequency; and calculating LIDAR data for multiple different sample periods that are arranged such that multiple different sample periods fall within each of the linear chirp sections, the LIDAR data for a sample period being calculated from the beat frequency of the composite signal during the sample period, and the LIDAR data for a sample period indicating the radial velocity and/or distance between the LIDAR system and the object.

11. The method of claim 10, wherein the sample periods overlap one another in time.

12. The method of claim 10 wherein
the LIDAR data for a sample period is calculated from the beat frequency of the composite signal and the beat frequency of the second composite signal during the sample period.

13. The method of claim 10, wherein, wherein the system output signal carries the first channel and the second channel such that the first channel and the second channel travel the same direction away from the LIDAR system.

14. The method of claim 10, wherein a duration of the linear chirp section is more than 2 times a duration of each one of at least a portion of the sample periods.

15. The method of claim 12, wherein a duration of each of the sample periods is more than 1 μs and less than 10 μs.

16. The method of claim 10, wherein calculating LIDAR data for the sample periods that are arranged such that multiple different sample periods fall within each of the linear chirp sections includes calculating the LIDAR data for each of the sample regions within one of the chirp sections.

17. The system of claim 1, wherein the electronics operate the LIDAR system such that the second channel has a series of second chirp cycles, each second chirp cycle including a second linear chirp section where a frequency chirp of the second channel is linear.

18. The system of claim 17, wherein a duration of the second linear chirp sections is equal to a duration of the linear chirp cycles.

19. The system of claim 18, wherein each of the second linear chirp sections occurs over the same time as one of the linear chirp sections.

20. The system of claim 19, wherein each of the second linear chirp sections occur at the same time as one of the linear chirp sections.

21. The system of claim 20, wherein the frequency of the first channel increases during second linear chirp sections when the frequency of the second channel decreases and the frequency of the first channel decreases during second linear chirp sections when the frequency of the second channel increases.

* * * * *